United States Patent
Cao et al.

(10) Patent No.: US 8,605,092 B2
(45) Date of Patent: Dec. 10, 2013

(54) METHOD AND APPARATUS OF ANIMATION PLANNING FOR A DYNAMIC GRAPH

(75) Inventors: Nan Cao, Beijing (CN); Shi Xia Liu, Beijing (CN); Li Tan, Beijing (CN); Michelle Xue Zhou, Briarcliff, NY (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 12/769,817

(22) Filed: Apr. 29, 2010

(65) Prior Publication Data

US 2010/0277481 A1  Nov. 4, 2010

(30) Foreign Application Priority Data

Apr. 30, 2009  (CN) .......................... 2009 1 0136970

(51) Int. Cl.
*G06T 11/20* (2006.01)
(52) U.S. Cl.
USPC ............................ 345/440; 345/589; 345/619
(58) Field of Classification Search
USPC ....................................................... 345/440
See application file for complete search history.

(56) References Cited

U.S. PATENT DOCUMENTS

| | | | |
|---|---|---|---|
| 5,896,139 A | 4/1999 | Strauss | |
| 6,216,134 B1 | 4/2001 | Heckerman | |
| 6,377,259 B1 | 4/2002 | Tenev | |
| 6,646,652 B2* | 11/2003 | Card et al. | 345/645 |
| 7,333,998 B2 | 2/2008 | Heckerman | |
| 2002/0085002 A1* | 7/2002 | Lamping et al. | 345/441 |
| 2004/0122803 A1* | 6/2004 | Dom et al. | 707/3 |
| 2005/0007383 A1 | 1/2005 | Potter | |
| 2005/0134589 A1* | 6/2005 | Heer et al. | 345/440 |
| 2007/0050708 A1* | 3/2007 | Gupta et al. | 715/513 |

OTHER PUBLICATIONS

M.L. Huang, P. Eades, and J. Wang, "Online Animated Graph Drawing Using a Modified Spring Algorithm," J. Visual Languages and Computing, vol. 9, No. 6, 1998.*

Ivan Herman, Guy Melançon, and M. Scott Marshall, "Graph Visualization and Navigation in Information Visualization: A Survey", IEEE Transactions on Visualization and Computer Graphics, vol. 6, No. 1, Jan.-Mar. 2000.*

* cited by examiner

*Primary Examiner* — Chauhan Ulka
*Assistant Examiner* — Jin Ge
(74) *Attorney, Agent, or Firm* — Cantor Colburn LLP; Gail Zarick (57) ABSTRACT

A method and apparatus of animation planning for a dynamic graph is provided. A first method includes grouping changed nodes into atomic partitions according to the relationships between the changed nodes and existing nodes. The next step is clustering the atomic partitions according to clustering distances between the atomic partitions to generate a running list for planning animation of node changes in the dynamic graph. The running list includes elements selected from the group consisting of clusters of atomic partitions and atomic partitions. The present invention is able to plan a multi-stage animation demonstration of changes of a dynamic graph and has a improved readability and animation speed.

17 Claims, 8 Drawing Sheets

METHOD AND APPARATUS OF ANIMATION PLANNING FOR A DYNAMIC GRAPH

CROSS-REFERENCE TO RELATED APPLICATIONS

This application claims priority under 35 U.S.C. §119 from Chinese Patent Application No. 200910136970.3, filed Apr. 30, 2009, the entire contents of which are incorporated herein by reference.

FIELD OF THE INVENTION

The invention relates to visualizing dynamic graphs, and more particularly, to a method and apparatus of animation planning for a dynamic graph.

DESCRIPTION OF THE RELATED ART

Graph drawing, also called graph visualization, refers to obtaining and displaying two-dimensional (2D) or three-dimensional (3D) representation of graphs by using topology and geometry, and it has been widely applied in fields of VLSI circuit design, social network analysis, cartology and bioinformatics etc. In graph visualization, dots are used to represent vertexes in a graph, and lines connecting the dots are used to indicate edges between the vertexes, and arrows may be used to denote directed edges. For a single graph, different visualization arrangement of its vertexes and edges will affect its understandability, usefulness, production cost and aesthetic properties, etc. A major purpose of graph visualization is to obtain and present, by using a proper layout algorithm, two-dimensional or three-dimensional presentations of graphs having good understandability and aesthetic properties (e.g., reducing edge intersection as much as possible, the lengths of different edges being approximately identical, etc.).

A dynamic graph refers to a graph that changes over time, its elements (nodes or edges) will be added and removed dynamically, and their attributes may also be changed dynamically. The major purpose of dynamic graph visualization is to disclose the changing patterns along the time dimension of a dynamic graph and to expose the evolution process of the graph or network. For example, dynamic graph visualization may help sociologists to find out evolution patterns of social networks, or help Business Intelligence (BI) analysts to dig out potential clients in different companies, or assist biologists to discover protein variation, and so on.

Figure 1:
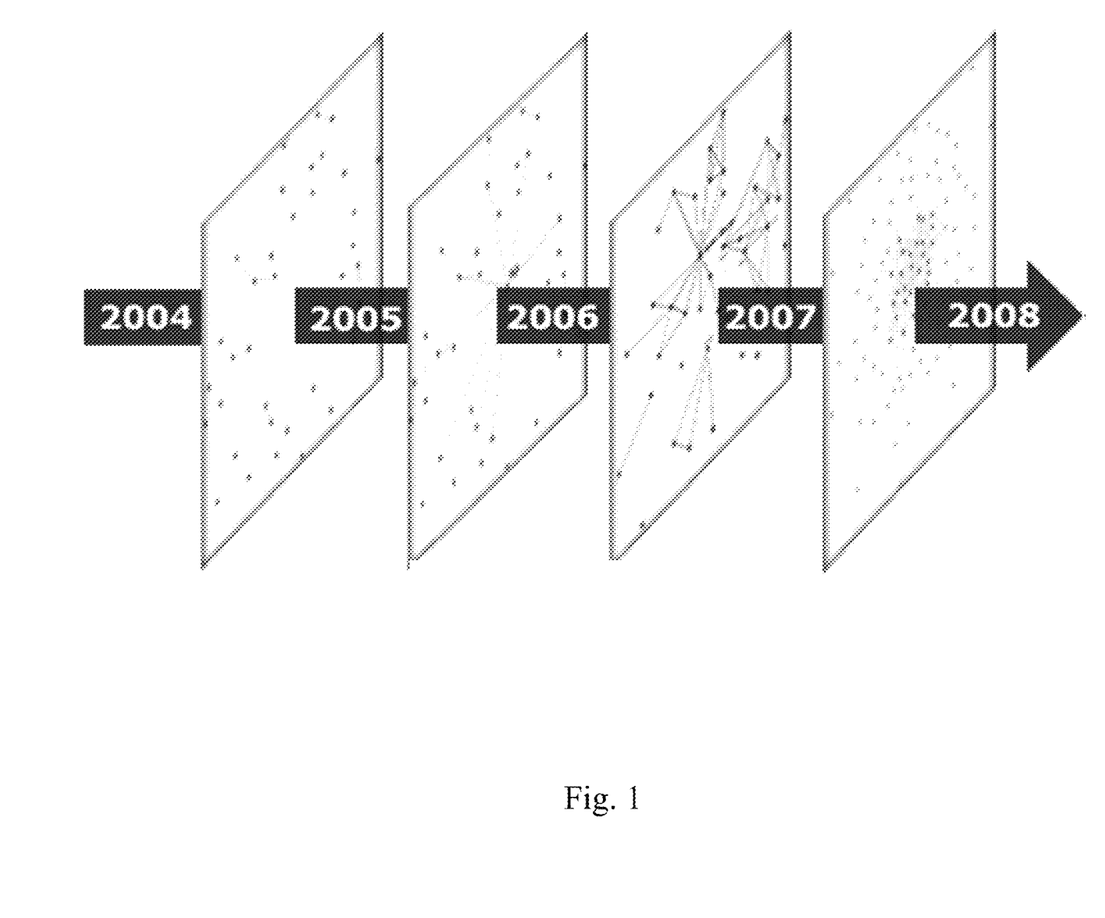
FIG. 1 depicts an example of demonstrating by animation changes of a social network graph of a community by years.

Many challenges exist in dynamic graph visualization. One of the most important challenges is to smoothly transition graph changes among different time frames to keep a user's mental map. Animation technology has been widely used for solving this problem. Animation can attract people's attention and represent changed parts as well as the constant parts of things. FIG. 1 illustrates an example of demonstrating by animation changes of a social network graph of a community by years, in which each frame shows a social network graph of the community in one of the years from 2004 to 2008. The nodes in the social network graph denote individuals forming the community, and the edges between the nodes denote the relationships between the individuals. The changes of increasing and decreasing the nodes and edges of the social network graphs between the years are displayed by consecutively playing the frames, thus intuitively disclosing the changing patterns of the community by years.

However, the existing animation technology in the field of dynamic graph visualization has several disadvantages. For example, for changes of the graph brought by adding or reducing a plurality of nodes, the existing animation technology will add or reduce all the nodes simultaneously. Though this costs the least amount of time, if there are many changes then important structural updates occurring cannot be highlighted. This will cause a user's visual confusion and reduce the readability of the animation. On the other hand, if the changes are executed respectively, one by one, too much time will be needed when there are many changes. Therefore, an animation planning method that provides a desirable balance between animation speed and readability is needed in the art.

In addition, in networks like dynamic social networks, changes of relationships (represented as edges in a dynamic graph representing social networks) are very common, and such changes of relationships include, for example, adding or removing association between individuals. Since changes of relationships may greatly alter the topological structure of a social network graph, it is difficult to analyze and completely present the influence of the relationship changes on the social network. In traditional animation technology, the changes of relationship are usually demonstrated by two steps. First, the edges are grown from their start nodes to their target nodes and connect these nodes. This step is used to show the changing of the graph topology. In other words, it depicts the reasons that cause the changes of the graph visualization. Second, all the nodes that are connected by the new edges and related nodes are dragged to their new positions together. It shows the phenomenon or results of the changes of the graph visualization. In this two-step model, there is a gap between the reason of the changes and the final changing results. Since different node movements are usually caused by different connections and the final movement results may be caused by multiple connections (reasons), such traditional animation technology fails to discover and display the major reasons for each node movement.

SUMMARY OF THE INVENTION

Accordingly, a first aspect of the present invention provides a method of animation planning for a dynamic graph. Changed nodes are grouped into atomic partitions according to the relationships between the changed nodes and existing nodes. Then, the atomic partitions are clustered according to clustering distances between the atomic partitions to generate a running list for planning animation of node changes in the dynamic graph. The running list includes elements selected from the group consisting of clusters of atomic partitions and atomic partitions.

A second aspect of the present invention provides an apparatus of animation planning for a dynamic graph. The apparatus includes an atomic portioning module and a clustering module. The atomic partitioning module groups changed nodes into atomic partitions according to the relationships between the changed nodes and existing nodes. The clustering module clusters the atomic partitions according to clustering distances between the atomic partitions to generate a running list for planning animation of node changes in the dynamic graph. The running list includes elements selected from the group consisting of clusters of atomic partitions and atomic partitions.

A third aspect of the present invention provides a method of animation planning for a dynamic graph. Nodes in the dynamic graph are grouped into node groups according to correlations between nodes and key nodes in the dynamic graph. A key node refers to a node to which a change connection is directly connected. Movements of the node groups caused by the connection changes are animated on a computer screen.

The technical solution of the present invention is capable of planning a multi-stage animation demonstration of node changes or connection changes in a dynamic graph. The animation demonstration effect of the present invention discloses the correlation between the changing elements, as well as between changed elements and existing elements in the dynamic graph. Thus, the present invention provides a dynamic graph with improved readability and a faster animation demonstration speed.

BRIEF DESCRIPTION OF THE DRAWINGS

The appended claims set forth the inventive features which are considered as characteristics of the present invention. However, the invention itself and its preferred modes, objects, features and advantages will be better understood by referring to the following detailed description of the exemplary embodiments when read in conjunction with the attached drawings, in which:

DESCRIPTION OF THE PREFERRED EMBODIMENTS OF THE INVENTION

The embodiments of the present invention will now be described with reference to the accompanying drawings. In the following description, numerous details are set forth to enable the present invention to be fully understood. It should be appreciated that the present invention is not limited to the described specific embodiments. On the contrary, it is contemplated to implement the present invention using any combination of the following features and elements, no matter whether they involve different embodiments or not. Therefore, the following aspects, features, embodiments and advantages are only illustrative rather than elements or limitations of the appended claims, unless explicitly stated otherwise in the claims.

One aspect of the present invention provides a method of animation planning for a dynamic graph that is used for planning the animation demonstration of node changes (i.e., increasing or decreasing of nodes) in the dynamic graph. In the method, according to the correlation between the changed nodes and the importance of these nodes in the dynamic graph, the nodes are clustered in different degrees. The animation demonstration of node changes is planned according to the clustering so that the changed nodes having smaller correlation with other changed nodes or more important nodes are demonstrated by animation independently or in smaller clusters. The changed nodes having closer correlation with one another are clustered together to be demonstrated by animation. Therefore, an animation demonstration effect which has good readability and costs less time is achieved.

Figure 2:
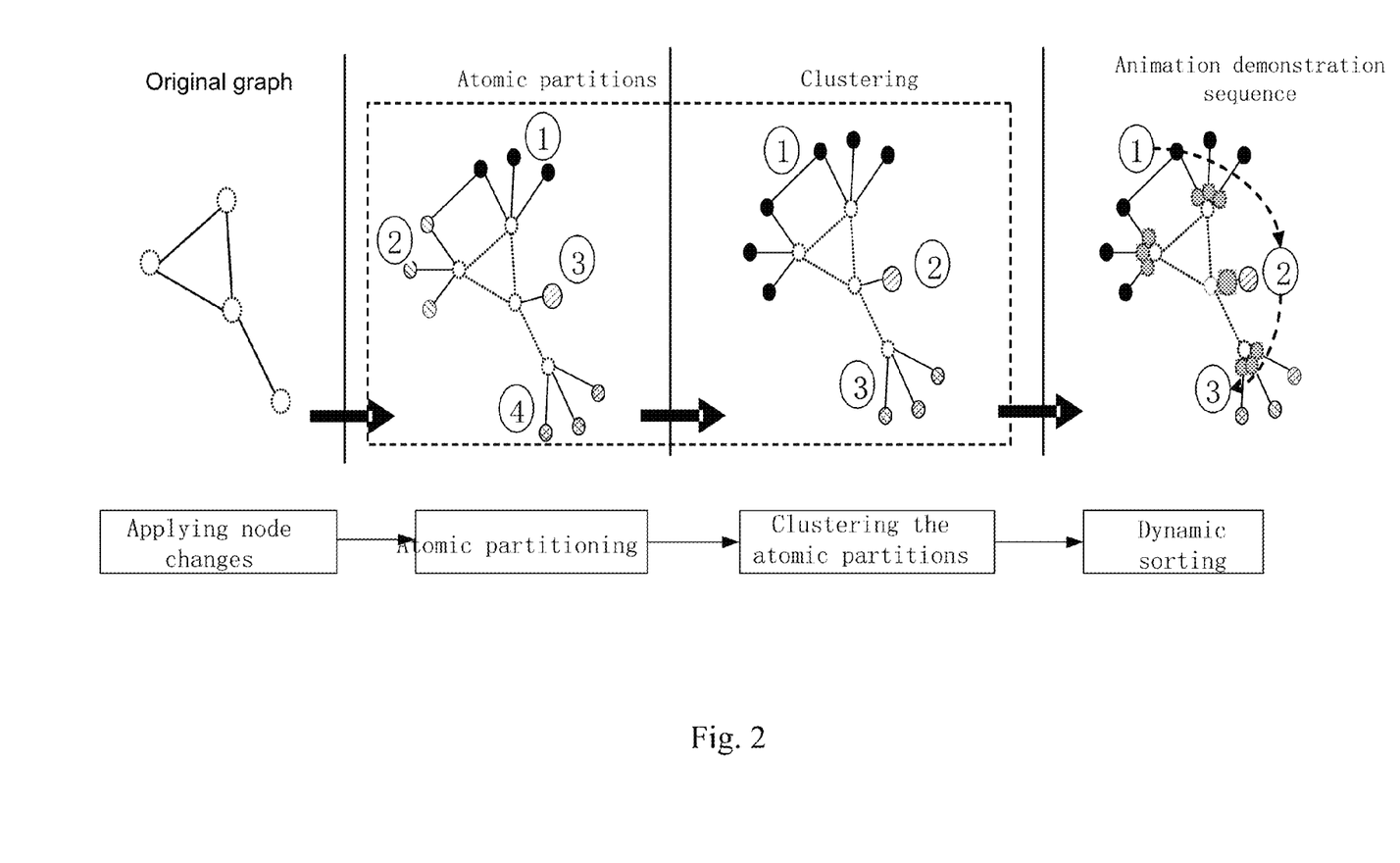
FIG. 2 schematically illustrates an overall flow of a method of animation planning for a dynamic graph according to an embodiment of the present invention.

FIG. 2 schematically illustrates the overall flow of a method of animation planning for a dynamic graph according to an embodiment of the present invention. As shown, the method includes the following main steps: atomic partitioning, clustering the atomic partitions, and optional dynamic sorting. The steps in the method of the present invention are described below.

Step 1: Atomic Partitioning

This step groups the changed nodes into some atomic partitions according to the relationship between the changed nodes and the existing nodes in the graph in response to applying the changed nodes into the dynamic graph. As is known in the art, applying node changes into a dynamic graph refers to applying the node changes to the topology of the dynamic graph so as to cause changes of the topological structure of the dynamic graph, and then applying an adopted proper layout algorithm to get a layout of the dynamic graph after the nodes are changed, that is, the target positions of the respective nodes.

All the newly added nodes directly connected with an existing node can be grouped into a single atomic partition. FIG. 2 illustrates such a grouping method, wherein 10 newly added nodes are directly connected to 4 existing nodes, and thus the 10 newly added nodes can be grouped into 4 atomic partitions respectively.

As for the relatively complex condition where some newly added nodes are not directly connected with any existing nodes, first the key node of each newly added node is found, and the newly added nodes having the same key node are grouped into a same atomic partition. The execution process of the method may be described as follows:

Input: (1) newly added nodes $n_i$ and (2) a dynamic graph G
Output: an atomic partition set C

DESCRIPTION

Figure 3:
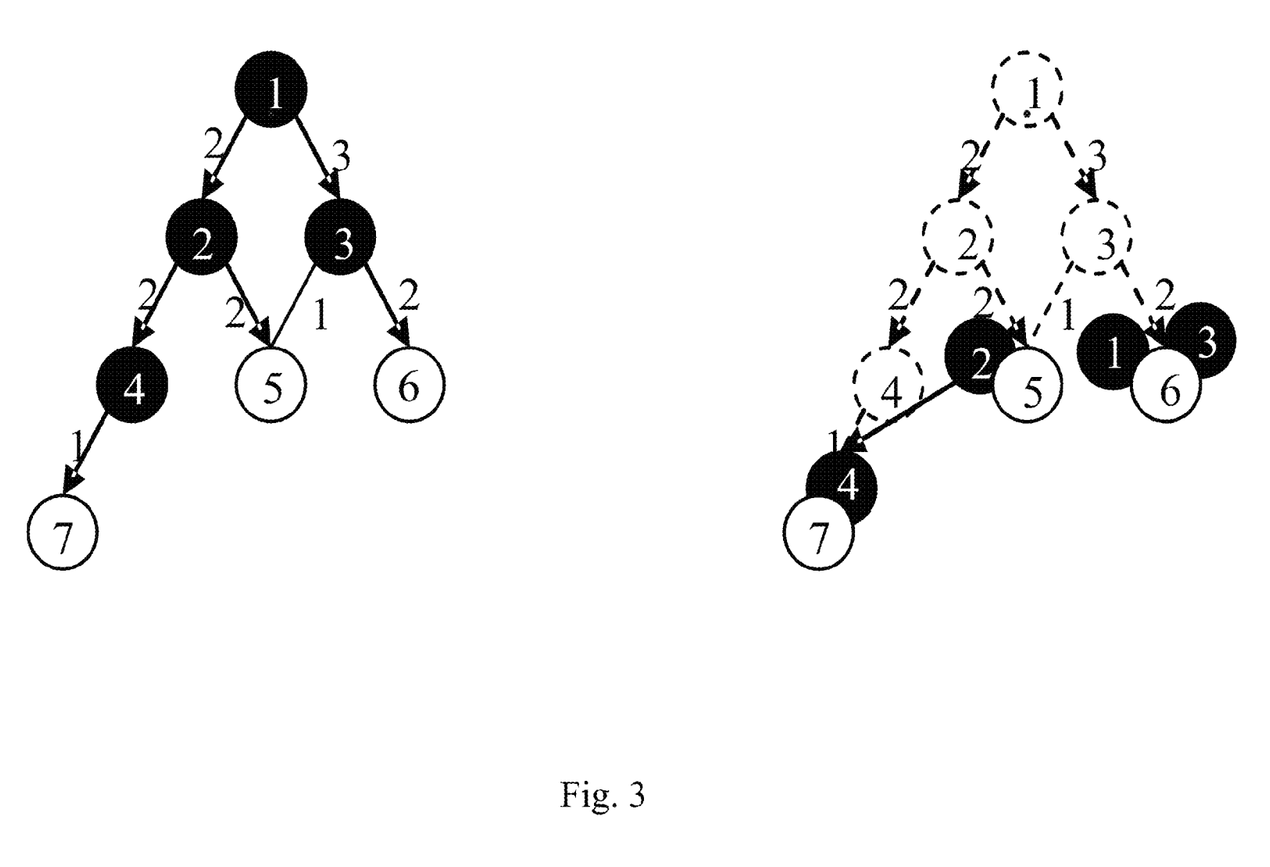
FIG. 3 shows an example of a method of grouping the changing nodes into atomic partitions according to an embodiment of the present invention.

1. For each $n_i$, perform a Breadth-First-Search from $n_i$ to graph G, record all the shortest paths that link $n_i$ to the nodes $\{m_i | m_i \epsilon G\}$ and denote the path set as S
2. For each shortest path in S, calculate its weight by simply adding the weights of edges in the path
3. Select the most weighted path in all the shortest paths, assuming the path links $n_i$ and $m_k$
4. Take the node $m_k$ as the key node of the newly added node $n_i$
5. Grouping all the $n_i$ with the same key node $m_k$ as an atomic partition $c_i$ and put it into C
6. Return C FIG. 3 illustrates an example of the execution process of the method of grouping the changed nodes into atomic partitions. As shown in the figure, nodes 5, 6 and 7 are existing nodes, and nodes 1, 2, 3, 4 are newly added nodes.

The set of the shortest paths from the newly added node 1 to the existing nodes is $S_1 = \{(1, 2, 5), (1, 3, 5), (1, 3, 6)\}$, and the weights of the paths are $W_1=\{4, 4, 5\}$, wherein the biggest weight is 5, thus the key node of the newly added node 1 is $P_1=6$;

The set of the shortest paths from the newly added node 2 to the existing nodes is $S=\{(2, 5)\}$, and the weight of path is $W_2=\{2\}$, wherein the biggest weight is 2, thus the key node of the newly added node 2 is $P_2=5$;

The set of the shortest paths from the newly added node 3 to the existing nodes is $S=\{(3, 5), (3, 6)\}$, and the weights of the paths is $W_3=\{1, 2\}$, wherein the biggest weight is 2, thus the key node of the newly added node 3 is $P_3=6$.

The set of the shortest paths from the newly added node 4 to the existing nodes is $S=\{(4, 7)\}$, and the weight of path is $W_4=\{1\}$, wherein the biggest weight is 1, thus the key node of the newly added node 4 is $P_4=7$.

Thus the newly added nodes 1 and 3 are grouped into a same one atomic partition, the newly added node 2 is an atomic partition, and the newly added node 4 is another atomic partition.

Step 2: Clustering the Atomic Partitions

This step is to cluster the atomic partitions into several clusters according to the correlation between the atomic partitions and the importance of the respective atomic partitions. This results in a proper running list composed of the clusters and balancing the animation speed and readability of the information. During the clustering process, a hierarchy structure composed of atomic partitions, intermediate clusters and final clusters will be formed, and the hierarchy structure may be referred to as an animation planning model. To cluster the atomic partitions into a hierarchy, the most important thing is to calculate the cluster distance between any two atomic partitions or clusters. Many methods can be used for calculating the clustering distance. One simple way is to calculate the screen distance between the atomic partitions or clusters using the Euclidean geometric distance formula, and to take the screen distance as the cluster distance. The screen distance may be, e.g., the length of the shortest path between the nodes contained in two atomic partitions or clusters, or the average length of the paths between the nodes contained in two atomic partitions or clusters. However, the present invention proposes a new method for calculating cluster distances by considering any one or more of the following factors:

1. The importance of the atomic partitions or clusters. The important atomic partition is desired to be displayed independently, without being clustered with other atomic partitions, and if the importance of a cluster is accumulated to a certain degree during the process of clustering the atomic partitions, it will not be clustered with other atomic partitions or clusters any more.

2. The topology distance between two atomic partitions or clusters. If there are many edges connecting two atomic partitions or clusters, then the two atomic partitions or clusters usually have close connections, and the changes to them are usually related so that they tend to be clustered together. Here, the topology distance between two atomic partitions or clusters may be defined as the number of common edges between.

3. The geometry distance between two atomic partitions or clusters. As described above, the geometry distance refers to the screen distance between two atomic partitions or clusters, and is usually denoted by the length of the shortest path between the nodes in the two atomic partitions or clusters or the average length of the paths between the nodes in the two atomic partitions or clusters.

With above consideration in mind, the clustering distance between any two atomic partitions or clusters may be calculated using the following formula:

$$dist(i, j) = d, \left(\frac{c}{e+1}\right)^\alpha$$

wherein, i and j denote two atomic partitions or clusters, dist(i,j) denotes the clustering distance between the two atomic partitions or clusters, d denotes the geometry distance between i and j, $e=e_{ij}/\sqrt{|i|\cdot|j|}$, $e_{ij}$ is the number of edges linking i and j, $|i|$ denotes the number of nodes in i, and $|j|$ denotes the number of nodes in j, $a=(0,1)$, is a weight parameter between 0 and 1, and it may be designated according to the required weights of the relevant factors, c denotes the importance of the combination of i and j, and is calculated using the following formula: $c=(|i|c_i+|j|c_j)/(|i|+|j|)$, wherein $c_i$ and $c_j$ denote the importance of i and j respectively, which may be calculated using the following formula:

$$c_i = \sum_{n\in i} \text{weight}(n) = \sum_{n\in i} (C(n) \cdot B(n)^\beta),$$

That is to say, $c_i$ is a sum of the importance of the nodes in i. The above formula further proposes a method of calculating the importance of node n, wherein $C(n)$ is the closeness centrality of node n, $B(n)$ is the between centrality of node n, and $\beta$ is a weight parameter. In fact, many known methods in the art may be used to calculate the importance of a node. For example, the degree centrality, the eigenvector centrality and the like of the node may also be considered.

While above is presented an exemplary method of calculating the clustering distance between the atomic partitions or clusters, in the following will be described the execution process of a method of using the clustering distance to perform hierarchical clustering on the atomic partitions so as to get a running list:

Input: (1) the atomic partition set C, (2) an importance threshold $\lambda_1$ and (3) the dynamic graph G Output: a running list L

DESCRIPTION

1. Set an initial set S=C

2. Calculate the importance $c_i$ of each element i in S. If i is an atomic partition, its importance is the sum of the importance of all the contained nodes; otherwise, if i is a cluster, its importance is the sum of the importance of the atomic partitions or clusters contained in the cluster. A plurality of methods can be used for calculating the importance of a node. For example, the importance of a node may be calculated using any one or a combination of the degree centrality, closeness centrality, between centrality and eigenvector centrality of the node.

3. For each i in S, if $c_i \geq \lambda_1$, i is put into L, wherein $\lambda_1$ is an importance threshold the value of which may be set according to the required weights of the relevant factors.

4. For every two elements i and j in S, dist(i,j) is calculated using the method described above, a) If the clustering distance between i and j is less than an average distance threshold $\lambda_2$, cluster i and j as a cluster M, remove i and j from S, and add M to S;

b) If the cluster distance between i and any other element in S is greater than or equal to the average distance threshold $\lambda_2$, put i into L.

5. Go to step 2 to start a new round of clustering until the clustering distances between all the elements in S are greater than or equal to the average distance threshold $\lambda_2$, then put all the elements in S to L.

6. Return L.

The above average distance threshold $\lambda_2$ can be calculated by the following equation:

$$\lambda_2 = \max(D(i,j))/(\text{count}-1),$$

wherein $\max(D(i,j))$ is the biggest clustering distance between the existing elements in S, and count is a number of the existing elements in S.

Figure 4:
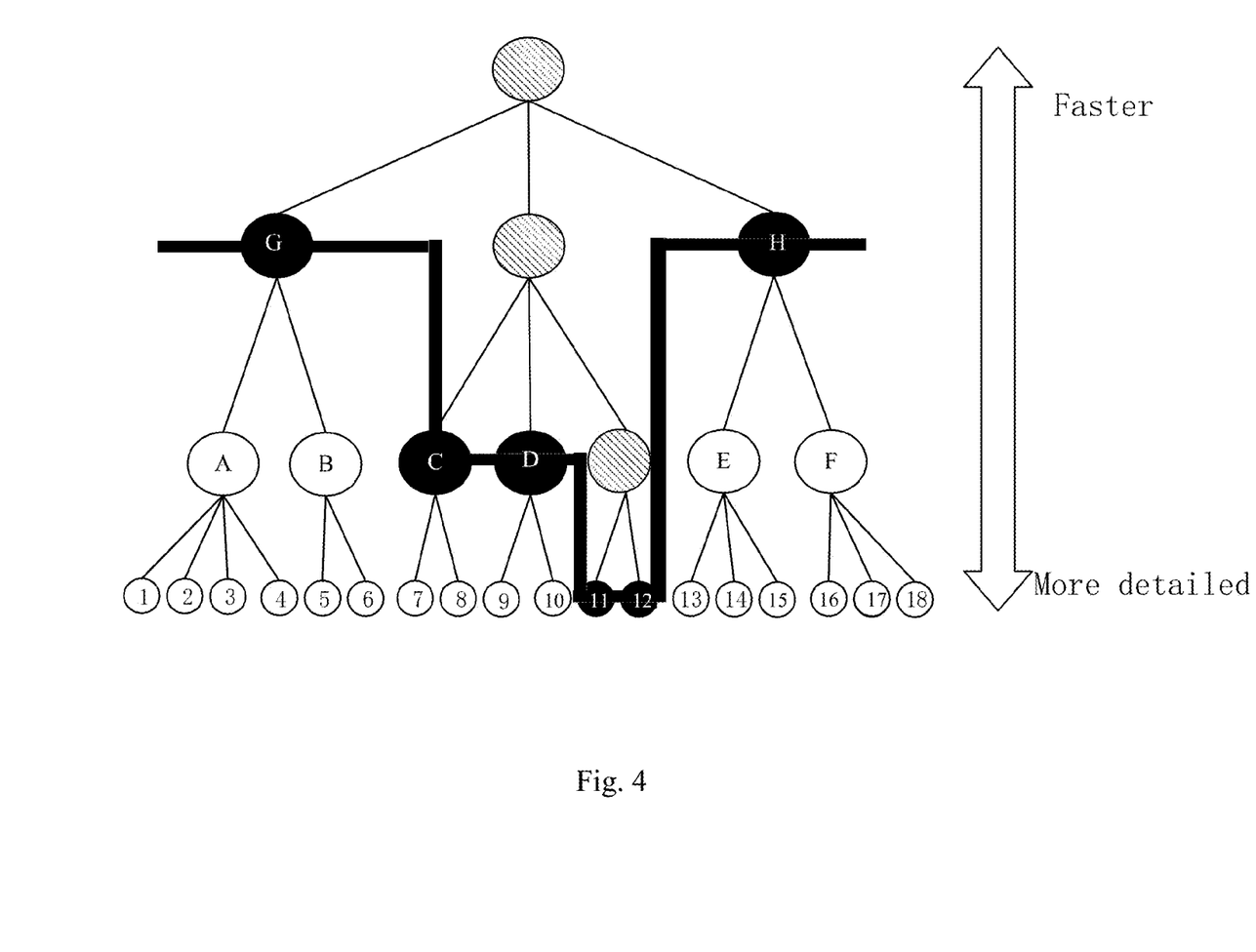
FIG. 4 illustrates an example of an animation planning model generated by a clustering process according to an embodiment of the present invention.

The above clustering process will generate an animation planning model. FIG. 4 illustrates an example of an animation planning model generated by such a clustering process. As shown, the model is a hierarchy, and its bottom layer is atomic partitions 1-18. In the first round of the clustering process, the atomic partitions 1-4, 5-6, 7-8, 9-10, 13-15, 16-18 are clustered into clusters A, B, C, D, E, F, respectively, and the atomic partitions 11 and 12 are transferred into the running list since their importance exceeds the importance threshold or the clustering distance between any of them and any other elements is greater than or equal to the average distance threshold. In the second round of the clustering process, clusters A-B, E-F are further clustered into clusters G, H, and clusters C and D are transferred into the running list since their importance exceeds the importance threshold or the clustering distance between any of them and any other elements is greater than or equal to the average distance threshold. In the third round of the clustering process, clusters G and H are transferred into the running list since their importance exceeds the importance threshold or the clustering distance between any of them and any other elements is greater than or equal to the average distance threshold. Therefore, the obtained running list will contain elements connected by the broken line shown in the figure, namely, clusters G, C, D, atomic partitions 11, 12, and cluster H. In this way, the animation demonstration is planed as being performed according to the contents of the running list, thus getting an animation demonstration effect well balancing the readability and the demonstration speed.

Step 3: Dynamic Sorting

This step is optional and it is for determining the animation demonstration order of the elements (clusters or atomic partitions) in the running list. Human beings' visual smooth tracing ability is non-symmetric, and their horizontal smooth tracing ability is usually better than their vertical smooth tracing ability, while their downward smooth tracing ability is usually better than their upward smooth tracing ability. Based on this, the objective of the dynamic sorting is to maximize horizontal movements as well as the downward movements, that is, determining the order of animation demonstration according to the screen positions of the clusters or the atomic partitions in the running list, so as to make the demonstration of the clusters or atomic partitions to be performed in the order from left to right, from up to down and then from right to left as much as possible. In addition, higher priorities are assigned to the more important clusters or atomic partitions, i.e., important clusters or atomic partitions are demonstrated earlier.

Specifically, first the importance [a1, a2, ... ai, ..., an] of the elements in the running list is acquired. The importance of the clusters or atomic partitions can be calculated using the method mentioned above.

Secondly, the visual order weights of each element, [$b_1$, $b_2$ ..., $b_i$, ... $b_n$], are determined according to the screen positions of the elements in the running list. The visual order weights can be specified according to the above animation demonstration order. For example, elements at the left side of the screen may be specified as having greater visual order weights than elements at the right side of the screen, and elements at the upper part of the screen may have greater visual order weights than elements at the lower part of the screen.

Then, the animation demonstration order weight of each element in the running list may be calculated using the following formula, and the animation demonstration order of each element in the running list may be determined according to the animation demonstration order weight:

$$O_i = [\alpha a_i + (1-\alpha) b_i]$$

wherein $O_i$ is the animation demonstration order weight of element i, $\alpha$ is coefficient representing the relative weight between the element importance weight and the visual order weight.

After the changed nodes have been clustered and a proper running list has been generated in step 2, and optionally the demonstration order of the clusters or atomic partitions has been determined in step 3, the animation demonstration of the node changes may be planned according to the running list and the demonstration order, so as to get an animation demonstration with both a good readability and a fast demonstration speed.

While above has been described a method of animation planning for a dynamic graph according to an embodiment of the present invention, it should be pointed out that the above description is merely exemplary rather than limitation to the present invention. For example, the present invention is also suitable for subtracting nodes from a dynamic graph, as well as for adding nodes to and subtracting nodes from a dynamic graph simultaneously.

In the case where nodes are subtracted from a dynamic graph, the processing of the subtracted nodes is the same as the processing of the added nodes, that is, grouping the nodes into atomic partitions and then clustering the atomic partitions, and optionally performing dynamic sorting on the clusters (and possibly atomic partitions) so as to plan the animation demonstration of the nodes according to the clustering and sorting.

In the case where nodes are added to and subtracted from a dynamic graph simultaneously, the added nodes and the subtracted nodes may be processed respectively, i.e., grouping the added nodes and the subtracted nodes into atomic partitions respectively, then clustering the atomic partitions respectively, and optionally performing dynamic sorting on the clusters (and possibly atomic partitions) so as to plan the animation demonstration of the added nodes and the subtracted nodes according to their respectively clustering and sorting. Preferably, the animation demonstration is planned as first demonstrating the subtracted nodes, then demonstrating that the original nodes in the dynamic graph move to target positions, and finally demonstrating the added nodes. The target nodes of original nodes in the dynamic graph may be calculated using the adopted layout algorithm after applying the node changes to the dynamic graph.

The present invention further provides an apparatus of animation planning for a dynamic graph, which can be used to execute the above method of animation planning for a dynamic graph. In the following is only briefly described the apparatus of animation planning for a dynamic graph, and for detailed information about the apparatus, reference may be made to the above description.

According to an embodiment of the invention, the apparatus of animation planning for a dynamic graph includes an atomic partition grouping module and a clustering module. The atomic partition grouping module groups changed nodes into atomic partitions according to the relationships between the changed nodes and existing nodes in the dynamic graph. The clustering module clusters the atomic partitions according to the clustering distance between the atomic partitions so as to generate a running list for planning animation demonstration of the changed nodes of the dynamic graph, wherein the elements of the running list include clusters of the atomic partitions and/or atomic partitions.

According to an embodiment of the invention, the apparatus further includes a sorting module. The sorting module sorts the order of animation demonstration of elements in the running list. The sorting is performed according to the screen positions of the elements and the importance of the elements.

According to an embodiment of the present invention, the atomic partitioning module includes, for each changed node, means for getting the most weighted path in the shortest paths by which the node is connected to existing nodes in the dynamic graph and taking the existing node in the dynamic graph connected by the path as the key node of the changed node; and means for grouping the changed nodes having a same key nodes into a same atomic partitions.

According to an embodiment of the invention, the clustering module includes means for transferring the atomic partitions or clusters of which the importance reaches or exceeds a importance threshold into a running list; means for clustering two atomic partitions or clusters between which the clustering distance is smaller than a distance threshold; means for transferring the atomic partitions or clusters of which the clustering distance with any other atomic partitions or clusters is bigger than or equal to said distance threshold, into the running list, wherein the above operation are performed iteratively until all the atomic partitions are put into the running list as atomic partitions or part of clusters.

According to an embodiment of the present invention, the clustering distance between two atomic partitions or clusters depends on any one or more of: a geometric distance between the two atomic partitions or clusters; the number of edges connecting the two atomic partitions or clusters; and importance of the combination of the two atomic partitions or clusters.

According to an embodiment of the present invention, the importance of an atomic partition or cluster depends on the importance of the nodes contained in the atomic partitions or clusters, and the importance of a node depends on any one or more of the degree centrality, closeness centrality, between centrality and eigenvector centrality of the node.

In another aspect of the invention, a method of animation planning for a dynamic graph is provided. The method is used for planning the animation demonstration of node movements caused by changes of connections (i.e., edges) in a dynamic graph. The method takes node changes of connections as the internal reasons for node movements. This allows for discovery of the internal reasons for causing the position changes of different nodes, that is, which edge changes cause the position changes of which nodes. Then, the nodes of which the movements are mainly caused by a same edge are grouped together. Finally, the animation demonstration of node movements is planned, so that the movements of the nodes of the same group are demonstrated by animation simultaneously and the movements of nodes of different groups are demonstrated by animation at different times.

Figure 5:
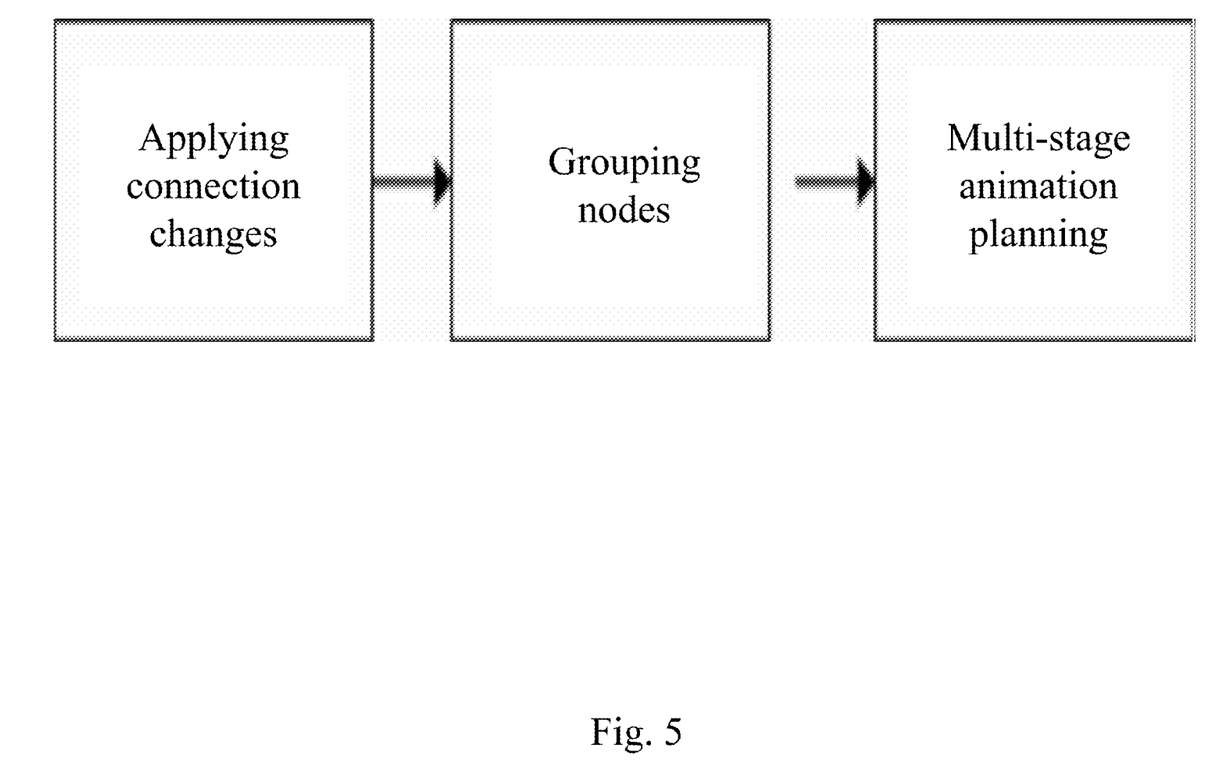
FIG. 5 illustrates an overall flow of a method of animation planning for a dynamic graph according to another embodiment of the present invention.

Now referring to FIG. 5, it shows an overall flow of a method of animation planning for a dynamic graph according to an embodiment of the present invention. As shown, the method includes the following main steps: applying connection changes, node grouping, and multi-stage animation planning. In the following will be described the method of animation planning for a dynamic graph according to an embodiment of the present invention by referring to the accompanying drawing.

Step 1: Applying Connection Changes

In this step, connection changes are applied to the topology of a dynamic graph causing the topological structure of the dynamic graph to be changed. Then, an adopted proper layout algorithm is applied to get the layout of the dynamic graph after the connection changes, namely, the target positions of the nodes.

Figure 6:
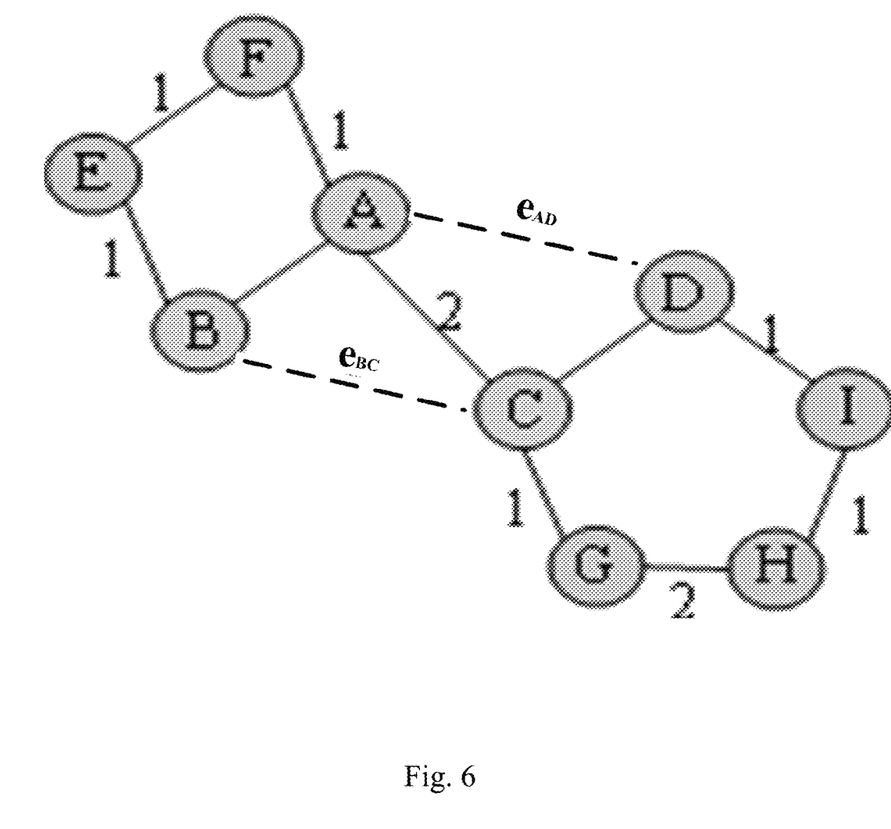
FIG. 6 illustrates an example of connection changes of a dynamic graph.

FIG. 6 shows an example of connection changes of a dynamic graph. As shown, two connections $e_{AD}$ and $e_{BC}$ are added in the dynamic graph, and the two connections will cause all the nodes' movements. The step may be accomplished by an existing dynamic graph visualization system, such as that can be obtained from http://sonia.stanford.edu. A detailed description thereof is omitted here.

Step 2: Node Grouping

In this step, every node is checked one by one with respect to each connection change to determine whether the connection change is the major reason for causing the node movement. Then, the nodes of which the movements are caused by the same connection change are grouped together. In the prior art, since all the nodes move together, the major reason for causing the movements of nodes cannot be displayed. The method of the present invention divides the nodes into different groups according to the major reasons for causing the node movements and plans the animation demonstration of the node movements according to the groups. This allows the animation demonstration effect to have a better readability.

According to an embodiment of the present invention, the detailed steps of node grouping are as follows:

1. For each change connection $e_{ij}$, an initial group $G_{ij}$ is created and the nodes i and j are put into $G_{ij}$, and at the same time the nodes i and j are put into a key node set K. That is to say, the nodes connected directly by changing connections are viewed as key nodes which are grouped into different groups according to the changing connections to which each key node belongs. For example, for the connection changes of the dynamic graph in FIG. 6, the created initial groups are $G_{AD}=\{A, D\}$, $G_{BC}=\{B, C\}$, and the set of the key nodes is K={A, D, B, C}. For the case where two or more changing connections share a common node, an initial group may be created, and the nodes directly connected by these changing connections may be all put into the initial group.

2. For each node i in every initial group, the correlation between i and any other node in the graph is calculated. That is to say, the correlation between each non-key node and each key node in the dynamic graph is calculated. The correlation between node i and j can be calculated using the following formula:

$$R(i,j) = \begin{cases} \left\{ \sum_{p \in P_{ij}} \left( \sum_{e_{kl} \in p, e_{kl} \in E} w_{kl}/|p|^2 \right) \right\} & e_{ij} \in E \\ -\infty & e_{ij} \notin E \\ +\infty & j \in K \end{cases}$$

wherein, R(i,j) is the correlation between node i and j; $P_{ij}$ is a path set including all the paths from the node i to j; $w_{kl}$ is the weight of the edge between node k and l; |p| is the topologic length of the path p; E is the set of all the edges of the graph; $e_{kl}$ is the edge between node k and I, and $e_{ij}$ is the edge between node i and j. That is to say, according to the formula, the correlation between two nodes depends on the weight of each edge in every path between the two nodes.

3. For each non-key node, it is put into the group containing the key node with the biggest correlation therewith. That is to say, the correlation between every non-key node and every key node is compared to get the key node having the biggest correlation with each non-key node, and then each non-key node is put into the group where the key node having the biggest correlation therewith is. For example, for each one of the nodes E, F, G, H, I in FIG. 6, according to the calculated correlations between them and the key nodes A, D, B, C, they are put into group $G_{AD}$ or $G_{BC}$.

In this way, in response to applying the connection changes to the dynamic graph, the nodes in the dynamic graph are grouped into different groups according to the main reason for causing the movement of each node in the dynamic graph, i.e., according to the corresponding major connection change for causing the movement of each node.

Step 3: Multi-Stage Animation Planning

The step plans a multi-stage demonstration of the animation in accordance with the node groups obtained from step 2, that is, the node movements in the same group in the graph are planned as being demonstrated by animation together. The node movements in different groups are planed as being demonstrated by animation at different times so as to display the main reasons for causing node movements more clearly. As for the relative time of animation demonstration of the node movements in different groups, there may be different cases.

Figure 7:
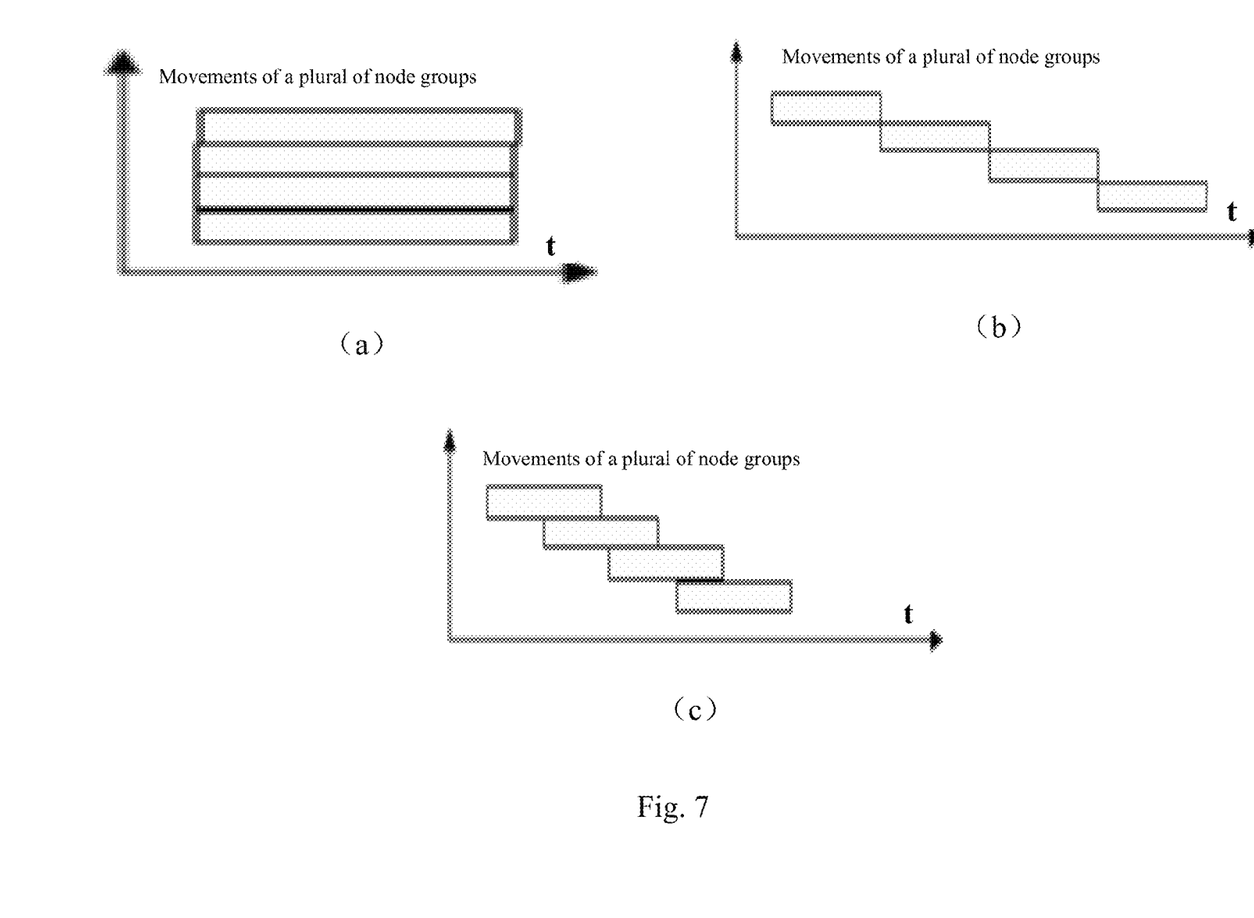
FIG. 7(a) illustrates animation-demonstrating node movements of all the groups in parallel.
FIG. 7(b) illustrates animation-demonstrating node movements of different groups one by one.
FIG. 7(c) illustrates that upon detecting that node positions are coincided, animation demonstration of movements of the next group of nodes is started at once.

FIG. 7(*a*) illustrates a case of animation-demonstrating the node movements of all the groups in parallel, that is, simultaneously animation-demonstrating the node movements of all the groups caused by a plurality of connection changes. This is actually the approach of simultaneously demonstrating all the node movements in the prior art, which will lose details in the graph changes and fail to disclose the causality in the graph changes.

FIG. 7(*b*) shows a case of animation-demonstrating the node movements in different groups one by one, that is, after the animation demonstration of the node movements of a previous group is completed, the node movements of a next group are animation-demonstrated immediately. Such an approach may keep the details in the graph changes and disclose the causality in the graph changes. However, a disadvantage of this approach is it may generate node coincidence. That is to say, when movements of one group of nodes are demonstrated by animation, the positions of some nodes in the group may coincide with the positions of other nodes, thus causing visual confusion. Therefore, what is needed is to animation-demonstrate the node movements group by group, and at the same time to avoid the coincidence of node positions as much as possible.

To this end, according to a further embodiment of the present invention, it further includes a step of detecting node position coincidence occurring in the movements of each group of nodes, and planning the animation demonstration in such a way that once the positions of a group of nodes in movement coincide with the positions of another group of nodes, the movements of the other group of nodes are started immediately.

FIG. 7 (*c*) illustrates the case of starting the movements of the next group of nodes immediately upon detecting the node position coincidence. As can be understood by those skilled in the art, the initial position of each node in the dynamic graph is known, the target position of each node has also been obtained by applying a proper layout algorithm in the above-mentioned step; in addition, according to a selected path calculation method (e.g., the force-directed animation model as described below), a moving path of each node from the initial position to the target position may be calculated, thus it may be detected whether and when each node coincides with other nodes during its movement.

In order to plan specifically the animation demonstration of each group of node movement, a moving path between the initial position and the target position of each node needs to be resolved. Various methods can be used to calculate the moving path between the initial position and the target position of each node, for example, the moving path of each node can be calculated by simply using the method of linear interpolation according to the initial position and final position of each node. A better method is to use a force-directed animation model to calculate the moving path of each node. The objective of the force-directed animation model is to find out a curve path consuming the minimum energy in the force field. Specially, in the model, for each pair of nodes linked by a connection, a spring force is designated; for each pair of nodes separated from or connected with each other, a universal expulsion force is designated; for each node, a variable external force F is designated to ensure that the node may finally move to the target position; and the energy consumption $\|F\|^2$ generated when the node moves is minimized. The model can be resolved by being converted into a related constraint optimization problem.

For example, the moving path of the node can be calculated by creating the following constraint optimization equations:

$$\begin{cases} \min \sum_i \int_{t_0}^{t_1} |F_i(t)|^2 \, dt \\ \sum_{(i,j) \in E} f_{ij} + \sum_{i \neq j} p_{ij} + F_i = m_i \left( \frac{\partial^2 X_i(t)}{\partial t^2} \right) \\ f_{ij} = -f_{ji} \\ f_{ij} = k_1 \left( \frac{\partial X_i}{\partial t} - \frac{\partial X_j}{\partial t} \right) \\ p_{ij} = k_2 \left( \frac{\partial X_i}{\partial t} - \frac{\partial X_j}{\partial t} \right) \\ X_i(t_0) = \text{Initial} \\ X_i(t_1) = \text{Final} \end{cases}$$

wherein $t_0$ is the initial time of the node movement; t1 is the termination time of the node movement; t is a time variable; $F_i$ is a variable force that node i bears; $f_{ij}$ is a spring force between nodes i and j; E is the set of edges of the dynamic graph; $p_{ij}$ is an expulsion force between any pair of nodes i and j; $m_i$ is the importance of node i; $X_i$ is a position of node i; $k_1$ is a coefficient representing the relationship between the spring force and the node movement speed; $k_2$ is a coefficient representing the relationship between the expulsion force and the node movement speed; Initial is the initial position of node i, and Final is the final position of node i. As is known by those skilled in the art, the above equations may be resolved by using discrete equations to replace the above partial differential equations in the above formula and using a finite differential method and Sequential Quadratic Programming, so as to get the moving path of the node i.

Figure 8:
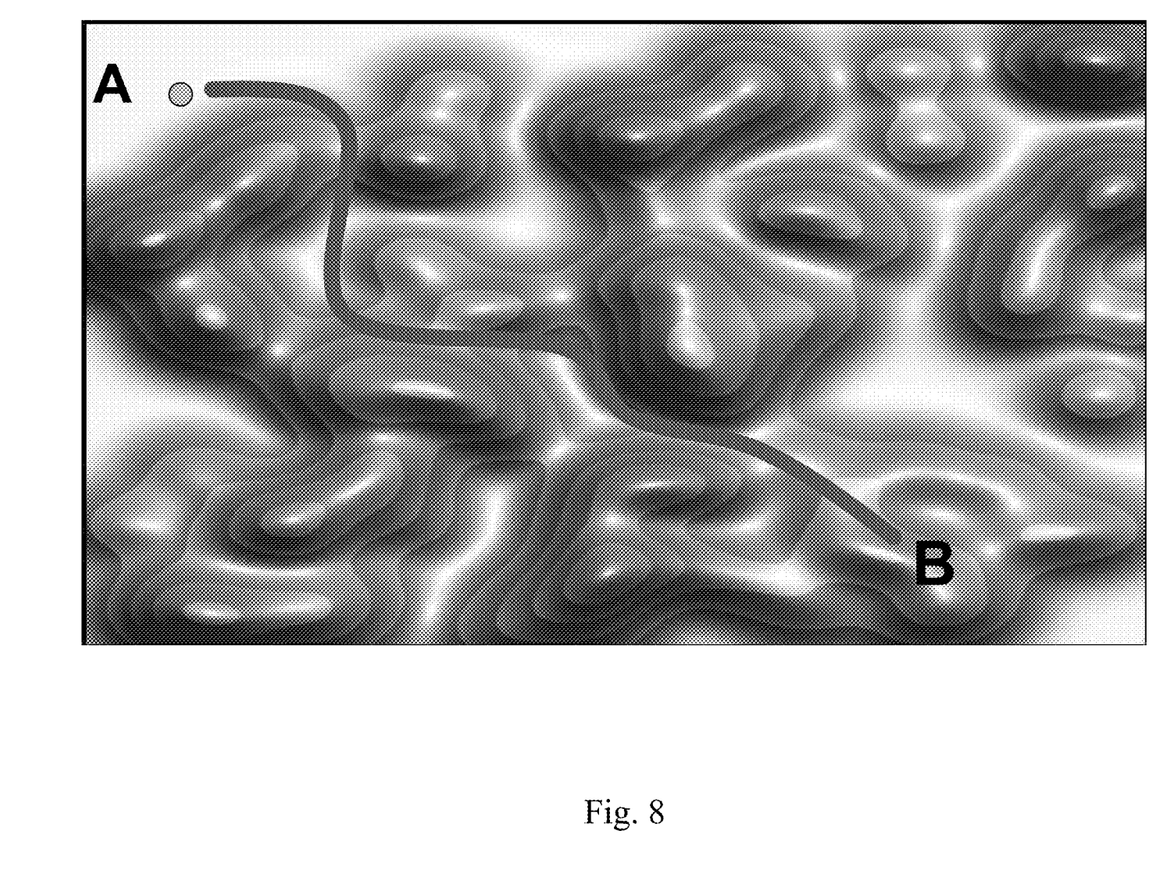
FIG. 8 schematically illustrates a moving path of a node moving from an initial position A to a target position B in a field of force.

FIG. 8 schematically illustrates a moving path of a node from the initial position A to the target position B in the force field obtained using the above method. When a moving path of each node in each node group is calculated by using the above method, the animation demonstration of each group of node movement can be planned specifically.

While above has been described a method of animation planning for a dynamic graph according to an embodiment of the present invention, it should be pointed out that the above description is only exemplary rather than a limitation to the present invention. For example, although the present invention has been described by taking the case of adding connections as an example, the present invention is also suitable for the case of subtracting connections from a dynamic graph, as well as the case of adding connections to and subtracting connections from a dynamic graph simultaneously. In these cases, the method of the present invention processes subtracted connections and added connections uniformly, that is, regardless of added connections or subtracted connections, the nodes are grouped according to the key nodes connected by the connections directly and the correlations between other nodes and the key nodes, and the animation demonstration is planned according to the node groups.

The present invention further provides an apparatus of animation planning for a dynamic graph that can be used to execute the above method of animation planning for a dynamic graph.

According to an embodiment of the present invention, the animation planning apparatus of dynamic graph includes: a grouping module for, in response to applying connection changes in a dynamic graph, grouping the nodes in the dynamic graph into different node groups according to correlations between nodes and key nodes in the dynamic graph, wherein a key node refers to a node to which each changed connection is directly connected in the dynamic graph; and a planning module for planning animation demonstration of the node movements caused by the connections changes by the node groups.

According to an embodiment of the invention, the grouping module includes: a calculation sub-module for calculating a correlation between each non-key node and each key node in the dynamic graph; a comparison sub-module for getting a key node having the biggest correlation with each non-key node by comparing the correlation between each non-key node and each key node; and a grouping sub-module for grouping each non-key node into the node group where the key node with the biggest correlation therewith is.

According to an embodiment of the present invention, the correlation between two nodes depends on the weight of each edge in each path between the two nodes.

According to an embodiment of the present invention, the apparatus further includes a coincidence detecting module for detecting position coincidence of nodes in the node group with other nodes occurring during the node movement, and the planning module includes means for planning animation demonstration of the node movement in such a way that once nodes in the node group have position coincidence with nodes in another node group during the node movement, the movement of the nodes in said other node group is started immediately.

According to an embodiment of the present invention, the planning module includes: means for getting the initial position of each node in the dynamic graph before applying the changed connection and the target position of each node after applying the changed connection; means for calculating a movement path of each node between the initial position and the target position by using the force-directed animation module, wherein the force-directed module comprises: a spring force between each pair of directly connected nodes, an exclusion force between each pair of nodes, a variable force for the pushing movement of each node, and the force-directed module is to find out a curve path consuming the minimum energy in the force field.

The present invention can be realized in hardware, software, or a combination thereof. The present invention may be realized in a computer system in a centralized manner, or in a distributed manner, in which, different components are distributed in a number of interconnected computer systems. Any computer systems or other apparatus suitable for executing the method described herein are appropriate. A typical combination of hardware and software can be a computer system with a computer program, which when being loaded and executed, controls the computer system to execute the method of the present invention, and constitute the apparatus of the present invention.

The present invention can also be embodied in a computer readable article of manufacture tangibly embodying computer readable instructions, which can realize all the features of the method described herein, and when being loaded into a computer system, can execute the method.

Although the present invention has been illustrated and described with reference to the preferred embodiments, those skilled in the art will understand that various changes in form and details may be made thereto without departing from the spirit and scope of the present invention.

What is claim is:

1. A method of animation planning for a dynamic graph, the method comprising the steps of:
    grouping changed nodes into atomic partitions according to the relationships between the changed nodes and existing nodes;
    clustering the atomic partitions according to clustering distances between the atomic partitions to generate a running list for planning animation of node changes in the dynamic graph;
    wherein the running list includes elements selected from the group consisting of clusters of atomic partitions and atomic partitions;
    grouping nodes in the dynamic graph into node groups according to correlations between nodes and key nodes in the dynamic graph, wherein a key node refers to a node to which a change connection is directly connected;
    detecting position coincidence of nodes in the node group with other nodes occurring during the node group movement; and
    animating the elements of the running list on a computer display to demonstrate the dynamic graph, and animating movements of the node groups caused by the connection changes such that once nodes in the node group have position coincidence with nodes in another node group during the node movement then movement of the nodes in the other node group is started immediately.

2. The method of claim 1, further comprising:
    sorting the elements in the running list into an order of animation, wherein the sorting is performed according to screen positions of the elements and importance of the elements.

3. The method of claim 1, wherein the grouping the changed nodes into the atomic partitions is carried out by:
    determining a most weighted path from a set of shortest paths by which each node is connected to existing nodes in the dynamic graph;
    setting the existing node determined to be connected by the most weighted path as the key node of the changed node; and
    grouping the changed nodes having a same key node into a same atomic partition.

4. The method of claim 1, wherein the clustering the atomic partitions is carried out by:

transferring atomic partitions or clusters having an importance that reaches or exceeds an importance threshold into the running list;
clustering atomic partitions or clusters between which a clustering distance is smaller than a distance threshold; and
transferring atomic partitions or clusters of which the clustering distance with any other atomic partitions or clusters is bigger than or equal to the distance threshold into the running list.

5. The method of claim 4, wherein the clustering distance between two atomic partitions or clusters depends on one or more of (i) a geometric distance between the two atomic partitions or clusters, (ii) a number of edges connecting the two atomic partitions or clusters and (iii) an importance of the combination of the two atomic partitions or clusters.

6. The method of claim 4, wherein the importance of an atomic partition or cluster depends on importance of nodes contained in the atomic partition or cluster and the importance of a node depends on any one or more of degree centrality, closeness centrality, between centrality and eigenvector centrality of the node.

7. An apparatus of animation planning for a dynamic graph, comprising:
an atomic partitioning module configured to group changed nodes into atomic partitions according to the relationships between the changed nodes and existing nodes;
a clustering module configured to cluster the atomic partitions according to clustering distances between the atomic partitions to generate a running list for planning animation of node changes in the dynamic graph;
wherein the running list includes elements selected from the group consisting of clusters of atomic partitions and atomic partitions;
a grouping module configured to group nodes in the dynamic graph into node groups according to correlations between nodes and key nodes in the dynamic graph, wherein a key node refers to a node to which a change connection is directly connected;
a position detecting module configured to detect position coincidence of nodes in the node group with other nodes occurring during the node group movement; and
an animation module configured to animate the elements of the running list on a computer display to demonstrate the dynamic graph, and animate movements of the node groups caused by the connection changes such that once nodes in the node group have position coincidence with nodes in another node group during the node movement then movement of the nodes in the other node group is started immediately.

8. The apparatus of claim 7, further comprising:
a sorting module configured to sort the elements in the running list into an order of animation, wherein the sorting is performed according to screen positions of the elements and importance of the elements.

9. The apparatus of claim 7, wherein the atomic partitioning module comprises:
means for determining a most weighted path from a set of shortest paths by which each node is connected to existing nodes in the dynamic graph;
means for setting the existing node determined to be connected by the most weighted path as the key node of the changed node; and
means for grouping the changed nodes having a same key node into a same atomic partition.

10. The apparatus of claim 7, wherein said clustering module comprises:
means for transferring atomic partitions or clusters having an importance that reaches or exceeds an importance threshold into the running list;
means for clustering atomic partitions or clusters between which a clustering distance is smaller than a distance threshold; and
means for transferring atomic partitions or clusters of which the clustering distance with any other atomic partitions or clusters is bigger than or equal to the distance threshold into the running list.

11. The apparatus of claim 10, wherein the clustering distance between two atomic partitions or clusters depends on one or more of (i) a geometric distance between the two atomic partitions or clusters, (ii) a number of edges connecting the two atomic partitions or clusters and (iii) an importance of the combination of the two atomic partitions or clusters.

12. The apparatus of claim 10, wherein the importance of an atomic partition or cluster depends on importance of nodes contained in the atomic partition or cluster and the importance of a node depends on any one or more of degree centrality, closeness centrality, between centrality and eigenvector centrality of the node.

13. A method of animation planning for a dynamic graph, the method comprising:
grouping nodes in the dynamic graph into node groups according to correlations between nodes and key nodes in the dynamic graph, wherein a key node refers to a node to which a change connection is directly connected;
animating, on a computer display, movements of the node groups caused by the connection changes; and
detecting position coincidence of nodes in the node group with other nodes occurring during the node group movement;
wherein the animating is carried out such that once nodes in the node group have position coincidence with nodes in another node group during the node movement then movement of the nodes in the other node group is started immediately.

14. The method of claim 13, wherein the grouping nodes is carried out by:
calculating a correlation between each non-key node and each key node in the dynamic graph;
comparing the correlation between each non-key node and each key node to determine a key node having a biggest correlation with each non-key node; and
grouping each non-key node into a node group containing the key node with the biggest correlation to the non-key node.

15. The method of claim 13, wherein the correlation between two nodes depends on a weight of each edge in each path between the two nodes.

16. The method of claim 13, wherein the animating is carried out by:
determining an initial position of each node in the dynamic graphic before applying connection changes;
determining a target position after applying connection changes; and
calculating a moving path of each node between the initial position and the target position using a force-directed animation model.

17. A non-transitory computer readable medium tangibly embodying computer readable instructions stored thereon which when executed causes a computer to carry out the steps of animation planning for a dynamic graph as claimed in claim 1.

* * * * *